United States Patent [19]

Lemke

[11] 4,330,807
[45] May 18, 1982

[54] MAGNETIC PLAYBACK APPARATUS HAVING IMMUNITY TO SKEW

[75] Inventor: James U. Lemke, Del Mar, Calif.

[73] Assignee: Spin Physics, Inc., San Diego, Calif.

[21] Appl. No.: 163,248

[22] Filed: Jun. 26, 1980

[51] Int. Cl.³ .................. G11B 5/25; H04N 5/78
[52] U.S. Cl. ...................... 360/119; 360/10
[58] Field of Search ............ 360/119, 110, 137, 83, 360/76, 9, 10, 35

[56] References Cited

U.S. PATENT DOCUMENTS

| 3,984,874 | 10/1976 | Mano | 360/119 |
| 4,086,639 | 4/1978 | Toshimitsu | 360/119 |
| 4,101,937 | 7/1978 | Jenkins | 360/76 |
| 4,193,098 | 3/1980 | Bixby | 360/10 |
| 4,258,398 | 3/1981 | Bixby | 360/76 |

OTHER PUBLICATIONS

Beguns, S. J.-*Magnetic Recording*, pub. by Murray Hill Books, 1949, pp. 87-88.
Stewart, W. E.-*Magnetic Recording Techniques*, Pub. by McGraw-Hill, 1958, pp. 73-76.
Snel, D. A.-*Magnetic Sound Recording*, Pub. by Philips Technical Library (Netherlands), 1959, pp. 83-84.
Haynes, N. M. *Elements of Magnetic Tape Recording*, Pub. by Prentice-Hall, 1957, pp. 139-141.

Primary Examiner—Robert M. Kilgore
Attorney, Agent, or Firm—Robert F. Cody

[57] ABSTRACT

By dimensioning a magnetic playback head so that it coacts with a magnetic signal track having an effective width that is less than one half the shortest signal wavelength to be played back divided by the tangent (or sine) of a predetermined magnetic skew angle that may be experienced by the head, skew angles less than the maximum skew angle will have no effect on the playback of signals having wavelengths greater than said shortest wavelength.

8 Claims, 7 Drawing Figures $\lambda \approx t_1 - t_2$
$\lambda = TW \tan S$ (NOT TO SCALE)

$$T_R = \frac{V_W}{\tan B} - \frac{V_W}{\tan A}$$

$$T = \frac{V_W}{\tan A}$$

$$\alpha = \tan^{-1} \frac{T}{V_W}$$

$$\beta = \tan^{-1} \frac{T + nT_R}{V_W}$$

$$S = \beta - \alpha$$

MAGNETIC PLAYBACK APPARATUS HAVING IMMUNITY TO SKEW

BACKGROUND OF THE INVENTION

1. Field of the Invention

This invention relates to magnetic tape recorder apparatus and, in particular, to tape recorder playback apparatus in which head skew has no effect on the bandwidth handling capability of such apparatus.

The invention, as well as the prior art, will be described with reference to the figures, wherein.

DESCRIPTION RELATIVE TO THE PRIOR ART

Figure 1:
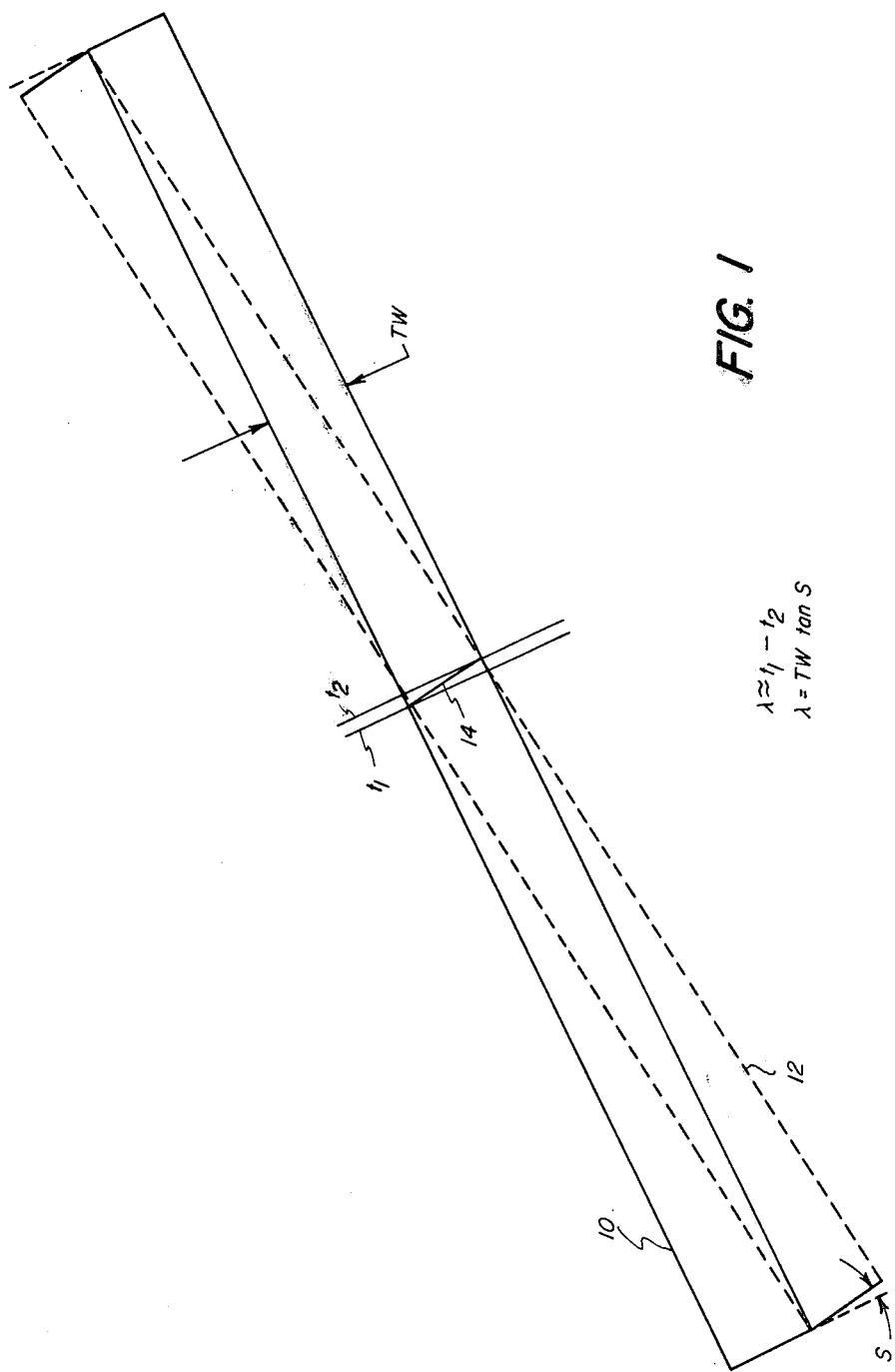
FIG. 1 is a diagram useful in describing how skew affects the playback bandwidth of a magnetic recorder.

When a magnetic playback head has a skewed path of travel relative to a track in which signal information is magnetically recorded, the playback bandwidth will be less than the recorded bandwidth because of playback head "azimuth error". Although the cause of such error is well known, it is believed that a review of azimuth error, and its effects, will facilitate appreciation of the invention. Consider, therefore, the record track 10 of FIG. 1; and imagine a playback head traversing a course 12 that is skewed relative to the record track. The gap 14 of the playback head, depicted at about the midpoint of the intersecting record and playback courses, may be considered infinitesimally short, thereby to eliminate the matter of "gap loss" as a thing of concern. Note that signal information which was recorded at a time $t_1$ will be sensed by one side of the head gap 14, whereas signal information which was recorded at a time $t_2$ will be sensed by the other side of the head gap. Since all signals sensed by the gap 14 at any given time are algebraically added within the head, it is apparent that signals of a wavelength shorter than $\lambda$, where $\lambda \approx t_1 - t_2$, cannot be detected by the skewed head gap 14 . . . $\lambda$ being equal to the product of the trackwidth TW multiplied by the tangent of the skew angle S. Such loss, during playback, of recorded wavelengths less than $\lambda$ is the result of "azimuth error".

Although the matter of azimuth error can manifest itself in the playback of any kind of magnetic recording format, current commercialization of "fast forwarding", and "reversing", helical scan video recorders suggests even greater concern for the matter of head azimuth error: the faster a helically recorded tape moves in playback (in comparison to its tape record speed), the greater the head azimuth error; and the greater the loss of playback bandwidth . . . which bears directly on the matter of video image quality. Reference, therefore, should be had to FIG. 2 which, in a not-to-scale showing, depicts a standard ("Standards of Electronic Industries Association of Japan", prepared by the VTR Technical Committee and published by the Technical Department of Electronic Industries Association of Japan, October, 1972) helically-formed track 16 of a video tape, the tape having been run at a record speed of $7\frac{1}{2}$ inches per second (ips). In the event that the tape in question were to be "stopped" during playback, the playback head(s) would follow a path 18. As noted in the aforementioned "Standards of Electronic Industries Association of Japan", the angles that the courses 16 and 18 make with respect to the tape length are, respectively, 3°7'43" (angle B) and 3°11' (angle A). Realizing that the gap(s) of a playback head(s) would, ideally, be oriented perpendicular to the course 16 (i.e., parallel to the line 20), it will be appreciated that, in connection with the representative recorder under discussion, $$a = 90° - B = 90° - 3°7'43'' = 86°52'7'' \quad (1)$$

$$b = a \quad (2)$$

$$c = 90° - A = 90° - 3°11' = 86°49', \text{ and} \quad (3)$$

$$d = b - c = 3'7''. \quad (4)$$

Thus, since the skew angle, S, also equals the angle d, the skew angle is 3'7".

Given a typical trackwidth (TW) of 4.33 mils, and still assuming an infinitesimally short playback head gap length, the skew angle of 3'7" translates, per the FIG. 1 equation, $\lambda = TW \tan S$, into a loss of wavelengths shorter than $3.9\mu''$ ($\mu''$ equals microinches), i.e., $$\lambda = 4.33 \tan 3'7'' \text{ (mils)}$$

$$\lambda = 4.33 \times 9 \times 10^{-4} \text{ (mils)}$$

$$\lambda \approx 3.9\mu''$$

Figure 2:
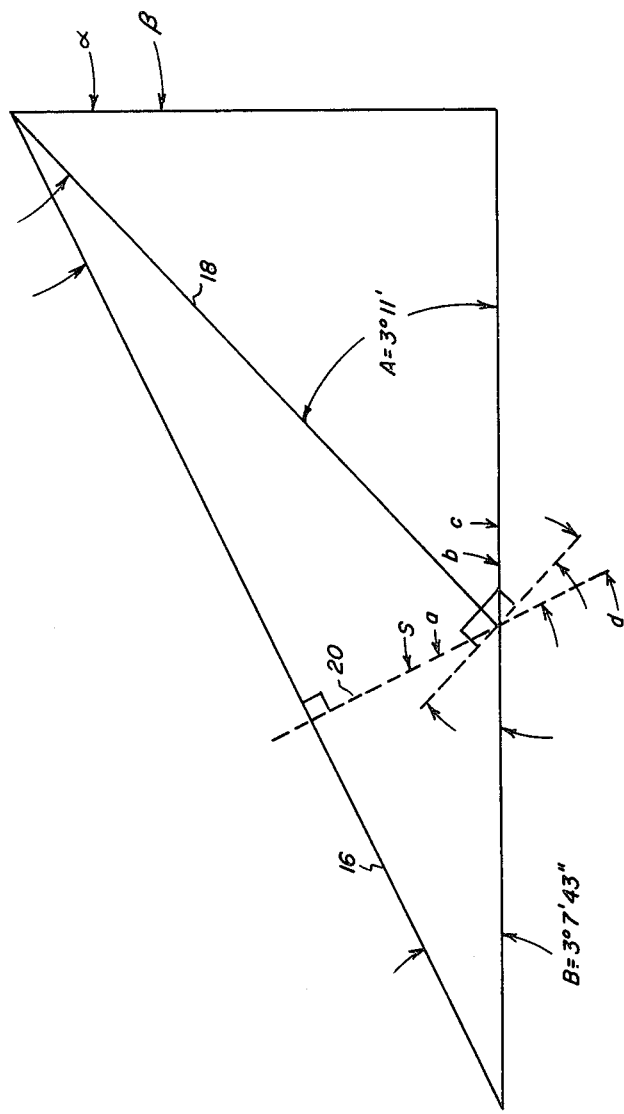
FIG. 2 is a diagram illustrating the orientations of head-to-tape paths when the tape of a commercial helical scan recorder is respectively moved at a standard rate, and stopped.

As specified in "Standards of Electronic Industries Association of Japan", noted above, the information writing speed for the helical scan video recorder corresponding to FIG. 2 is about 500 ips; and, given a typical playback head gap length of $50\mu''$, such would correlate with a recorded bandwidth of 10 mHz (i.e., $$\frac{500 \text{ ips}}{50\mu''} = 10 \text{ mHz}).$$

When the wavelength loss corresponding to a gap length of $50\mu''$ is combined with the indicated wavelength loss caused by azimuth error (see FIG. 3), the playback bandwidth, for a playback head travelling the course 18 of FIG. 2, will be only 9.27 mHz (i.e., $$\frac{500 \text{ ips}}{53.9\mu''} \approx 9.27 \text{ mHz}),$$

a bandwidth loss of 7.3 percent.

Now, it will be appreciated from FIG. 2 that:

$$\alpha = 90° - A, \text{ and} \quad (5)$$

$$\beta = 90° - B, \quad (6)$$

which is to say, from Equations (1) and (3) above, that $$\alpha = c, \text{ and} \quad (7)$$

$$\beta = \alpha. \tag{8}$$

Therefore, from Equation (2), since $$a = b,$$

$$b - c = \beta - \alpha. \tag{9}$$

And, from Equation (4), since $$b - c = d = S,$$

then $$S = \beta - \alpha \tag{10}$$

With Equation (10) in mind, reference should now be had to FIG. 4 which, again in a not-to-scale showing, illustrates what happens in a helical scan recorder whose tape is slewed fast-forward, during playback, at n multiples of the nominal tape record speed ($7\frac{1}{2}$ ips), the video track extending, per the "Standards of Electronic Industries Association of Japan", crosswise of the tape for a distance of $V_W = 0.394''$. As will be apparent, the distance $T_R$ that the running tape moves during the time of one recording scan equals the difference between the distances ($T_R + T$) and T, i.e., $$T_R = \frac{V_W}{\tan B} - \frac{V_W}{\tan A} \tag{11}$$

$$T_R = \frac{.394}{.0546} - \frac{.394}{.0555} = .06'', \text{ and}$$

$$T = \frac{V_W}{\tan A} \tag{12}$$

$$T = \frac{.394}{.0555} = 7.16''. \text{ Since}$$

$$\alpha = \tan^{-1} \frac{T}{V_W} \tag{13}$$

$$\alpha = \tan^{-1} \frac{7.16}{.394} = \tan^{-1} 18.17,$$

$$\alpha = 86.8°;$$

and for, say, a playback fast-forward speed multiple of n=10, $$\beta = \tan^{-1} \frac{T + n T_R}{V_W} \tag{14}$$

$$\beta = \tan^{-1} \frac{7.16 + 0.6}{.394} = \tan^{-1} 19.7$$

$$\beta = 87.1°.$$

Figure 3:
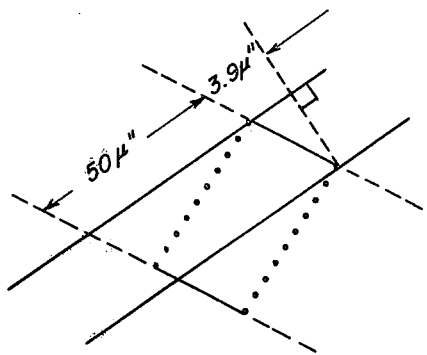
FIG. 3 is a diagram useful in describing how the effective bandwidth of a commercial recorder is lessened when the playback head thereof skews relative to a record track.

Thus, from Equation (11) above, where:

$$S = \beta - \alpha = 87.1° - 86.8°,$$

the skew angle S, for the "fast-forwarding" apparatus in question, will equal 0.3°. Given a skew angle of 0.3°, such translates, for a recorded trackwidth TW of 4.33 mils, into the loss, during playback, of recorded wavelengths which are shorter than $\lambda$ plus the gap length of the playback head. That is, per the equation associated with FIG. 1, $$\lambda = TW \tan S$$

$$\lambda = 4330\mu'' \tan 0.3°$$

$$\lambda = 4330\mu'' (0.0052) = 22.5\mu'';$$

and, per FIG. 3, for a nominal playback head gap length of $50\mu''$, the shortest resolvable wavelength becomes $50\mu'' + 22.5\mu'' = 72.5\mu''$ for the "fast-forwarding" tape. At a head-to-tape playback speed of 500 ips, a minimal resolvable wavelength of $72.5\mu''$ translates to an upper bandedge limit of about 6.9 MHz (i.e., $$\frac{50 \text{ ips}}{72.5\mu''} \simeq 6.9 \text{ MHz}).$$

Not only is such a loss of bandwidth bad in and of itself, but the fact of the matter is that, since helical scan video recordings are usually by use of frequency modulation, intelligible playback of FM-encoded information by the representative apparatus discussed in relation to FIG. 2, at n=10 multiples of the tape record speed, will be impossible.

What is evidenced above is that playback head azimuth error will adversely affect the playback of magnetically recorded information in proportion to the size of the error, and this is so regardless of the recorder apparatus which suffers the azimuth error. Calculations which appear above are for purposes of demonstrating the reality and severity of the head azimuth error problem, and are not intended to convey the impression that the invention is only applicable to the particular video recorder represented by the diagrams of FIGS. 2 through 4.

While one might suggest that solution to the head azimuth error problem may be provided by a straightforward compensatory dynamic skewing of the playback head as needed, such is not that easy to do. In the case, for example, of video heads on a rotary head wheel of a helical scan recorder, the whole wheel assembly would have to be skewed by "precessional" forces; and, bearing in mind that the heads of a rotary head wheel ordinarily peek out from within a narrow slot in a head drum, there is a limit to the amount of azimuth error correction which can be effected anyway.

SUMMARY OF THE INVENTION

The invention provides inherent immunity to the head azimuth error problem, elegantly doing so without the need to alter any parts, or part positioning, etc., during the playback of magnetically recorded information. At the heart of the invention is a recognition that proper track dimensioning vis-a-vis both the maximum anticipated skew angle and the shortest wavelength to be reproduced during playback will inherently nullify the effects of head azimuth error. How and why such dimensioning effects head azimuth error immunity will be discussed below:

DETAILED DESCRIPTION OF THE INVENTION

Figure 5:
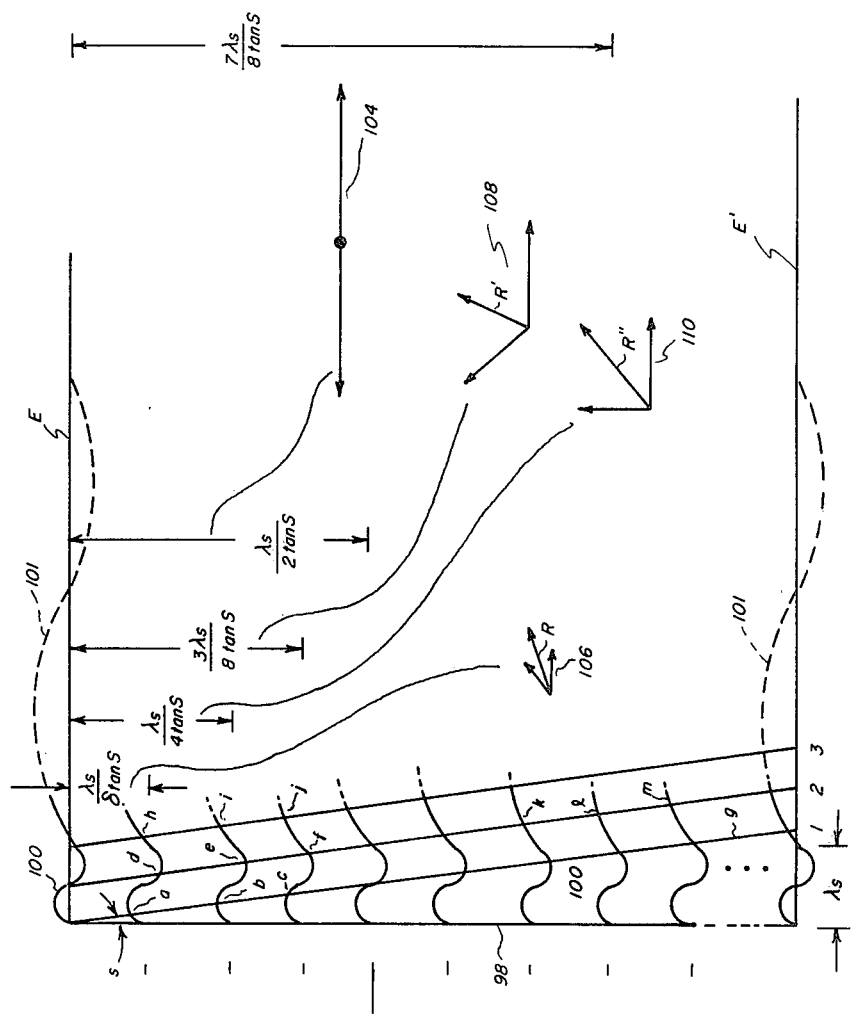
FIG. 5 is a diagram which is useful in explaining the effectiveness of apparatus according to the invention.

Referring, therefore, to the not-to-scale diagrammatic showing of FIG. 5, assume that a magnetic tape track 98 has been recorded with a band of signals, the shortest wavelength $\lambda_S$ within the band being that associated with the signal 100. As indicated, a signal 101 of a longer wavelength is also depicted as recorded in the tape track. It will be appreciated that recorded signals extend from one edge (E) of the tape track to the other edge (E'); and, for sake of easy visualization, sine waves are used to represent the recorded signals, although, as is known, such signals actually occur as sinusoidal variations in the concentration of magnetization within and along the tape track.

Now, given a "worst case" playback head azimuth error corresponding to a skew angle S (i.e., given a maximum anticipated skew angle S), consider the width of the recording as divided into discrete subtrack widths equal to $$\frac{\lambda_S}{8} \div \tan S.$$

(The worst case skew angle S must be determined for particular utilizations of the invention. If, for example, in the above-discussed helical scan recorder which correlates with FIGS. 2 through 4, the speed multiple n were selected to be some number less than n=10, the "worst case" skew angle would, of course, be less than the calculated 0.3° . . . whereas were such speed multiple selected to be some number greater than n=10, then the "worst case" skew angle would be correspondingly greater than 0.3°.) Assuming that the length of the gap g of the playback head is, ideally, zero, note what happens at such gap for subtrack widths of:

$$\frac{\lambda_S}{8 \tan S}, \frac{\lambda_S}{4 \tan S}, \frac{3\lambda_S}{8 \tan S}, \text{ and } \frac{\lambda_S}{2 \tan S}.$$

For a track that is $$\frac{\lambda_S}{2 \tan S}$$

wide, for example, as the gap g moves to the right in FIG. 5, the positive half-cycle of the signal 100 at the track edge E starts to coact with the gap g, whereas at a track distance of $$\frac{\lambda_S}{2 \tan S}$$

from the track edge E, the negative half-cycle of the signal 100 starts to coact with the gap g. Vectors 104, corresponding in length to the "amount" of signal experienced by the gap g and reflecting the phase disparity between signals which are so spaced trackwise apart, indicate that the resultant signal, of wavelength $\lambda_S$, which is sensed by the gap g is zero when the trackwidth is $$\frac{\lambda}{2 \tan S}.$$

(Were the trackwidth to be infinitesimally narrow, thereby negating the effect of phase disparity between signals sensed at different parts of the gap, the problem of phase disparity would be overcome, but at the expense of a zero signal from a track of zero width.) For all trackwidths less than $$\frac{\lambda_S}{2 \tan S},$$

it will be appreciated, a signal resultant will, in fact, occur. And, such signal resultant will (1) have the same (rotational) frequency as the frequency of the signal 100 being sensed, and (2) reflect immunity to head azimuth errors corresponding to skew angles less than angle S.

With particular reference now to the trackwidth $$\frac{\lambda_S}{8 \tan S},$$

the signal vectors 106 which correspond to such trackwidth are appropriately shorter than the vectors 104 (reflecting the narrower trackwidth) yet productive of a signal resultant R which is of the same dimension (signal strength) as the signal resultant R', similarly produced from a wider track of width $$\frac{3\lambda_S}{8 \tan S}.$$

That is, the signal vectors 108 which combine to form the signal resultant R'—though larger than the vectors 106—partially buck and thus adversely affect the size of the signal resultant R'. At a trackwidth corresponding to $$\frac{\lambda_S}{4 \tan S},$$

the ideal occurs: the signal vectors 110 are productive of the largest possible resultant R" having the (rotational) frequency of the signal 100.

To demonstrate further the operability of the invention, consider an arbitrarily-selected trackwidth of $$\frac{3\lambda_S}{8 \tan S}:$$

when the skewed gap g has the relative head-to-tape position 1, the gap g senses only "positive" signal contributions from representative points a, b, c; at position 2, the skewed gap g senses only "negative" signal contributions from representative points, d, e, f; at position 3, the skewed gap g senses only "positive" signal contributions from representative points h, i, j; and when the gap g has a position between positions 2 and 3, such gap will be productive of a transition between negative and positive signals . . . as should be the case. Thus, it will be appreciated, so long as a track has a width less than $$\frac{\lambda_S}{2 \tan S},$$

signals of wavelengths greater than $\lambda_S$ will be detectable by the gap g, regardless of any gap skew less than angle S.

Much has been made herein that the invention is operable for trackwidths which are less, but not more, than $$\frac{\lambda_S}{2 \tan S}.$$

Consider, therefore, for illustrative purposes, a trackwidth "greater" than $$\frac{\lambda_S}{2 \tan S},$$

viz., a trackwidth of $$\frac{7\lambda_S}{8 \tan S}.$$

Aside from demonstrating what is clearly not within the scope of the invention, such a consideration will provide additional insight into the workings of the invention: Given that the gap g should be sensing only negative signal contributions when the gap has, say, the position 2 (see above), note that a trackwidth of $$\frac{7\lambda_S}{8 \tan S}$$

will produce "positive" signal contributions from points k, l, m which will corrupt the "negative" signal contributions which occur at points d, e, f, thereby rendering the full signal sensed by the gap as ambiguous and/or meaningless.

Figure 4:
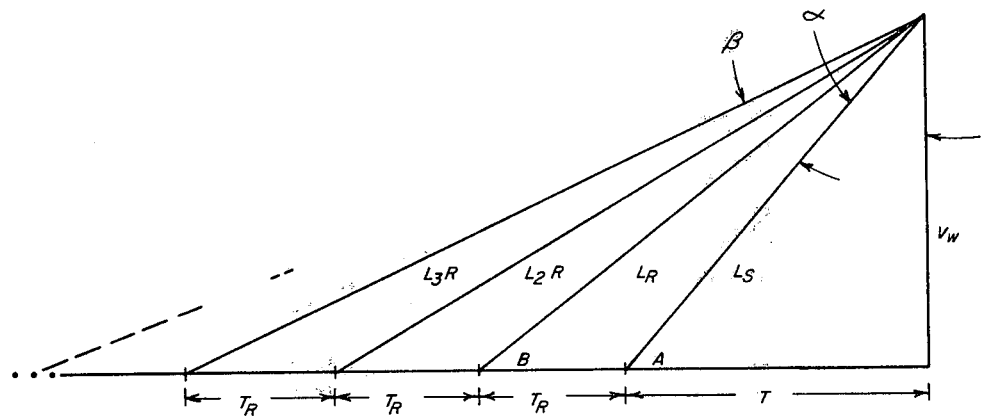
FIG. 4 is a diagram useful in illustrating the effects of "fast forward" tape motion on the matter of head skew.

With the above teaching as background, reference should again be had to the video recorder which was represented by the diagrams of FIGS. 2 through 4. In such a recorder, complete immunity to head azimuth error will be achieved by use of any trackwidth less than $$\frac{\lambda}{2 \tan S}$$

and, optimally, by a trackwidth of $$\frac{\lambda}{4 \tan S}.$$

That is, for a maximum skew angle of 0.3°, and an upper bandedge wavelength of 50μ", optimally, the trackwidth TW should be:

$$TW = \frac{\lambda}{4 \tan S} = \frac{50 \times 10^{-6}}{4 \times 0.0052}$$

With such a trackwidth, skew angles less than 0.3°, will have no effect on the playback bandwidth.

It is true that a trackwidth of 4.33 mils will produce a signal of greater amplitude than one of 2.5 mils, but at the cost of bandwidth in the presence of skew. What the invention addresses, however, is not a matter of a mere tradeoff between the signal-to-noise ratio and bandwidth: If the bandwidth, say, in an FM system degenerates because of azimuth error to a point where the center frequency is lost, the signal-to-noise ratio will inherently go to zero, whereas if a relatively narrow playback track pursuant to the invention is employed, the signal-to-noise ratio will, inherently, never be zero because of azimuth error.

(Throughout this specification, "trackwidth" has concerned a dimension associated with the widthwise dimension of a track "on" a recording medium. If, on the other hand, the "trackwidth" dimension is to concern the widthwise dimension of a head core to effect recording as taught herein, the sine of the skew angle S should be substituted for the tangent of the skew angle S in all of the above equations. Notwithstanding this point, however, it is well known that the tangent and sine for small angles are approximately equal and may be readily substituted for each other.)

Figure 6:
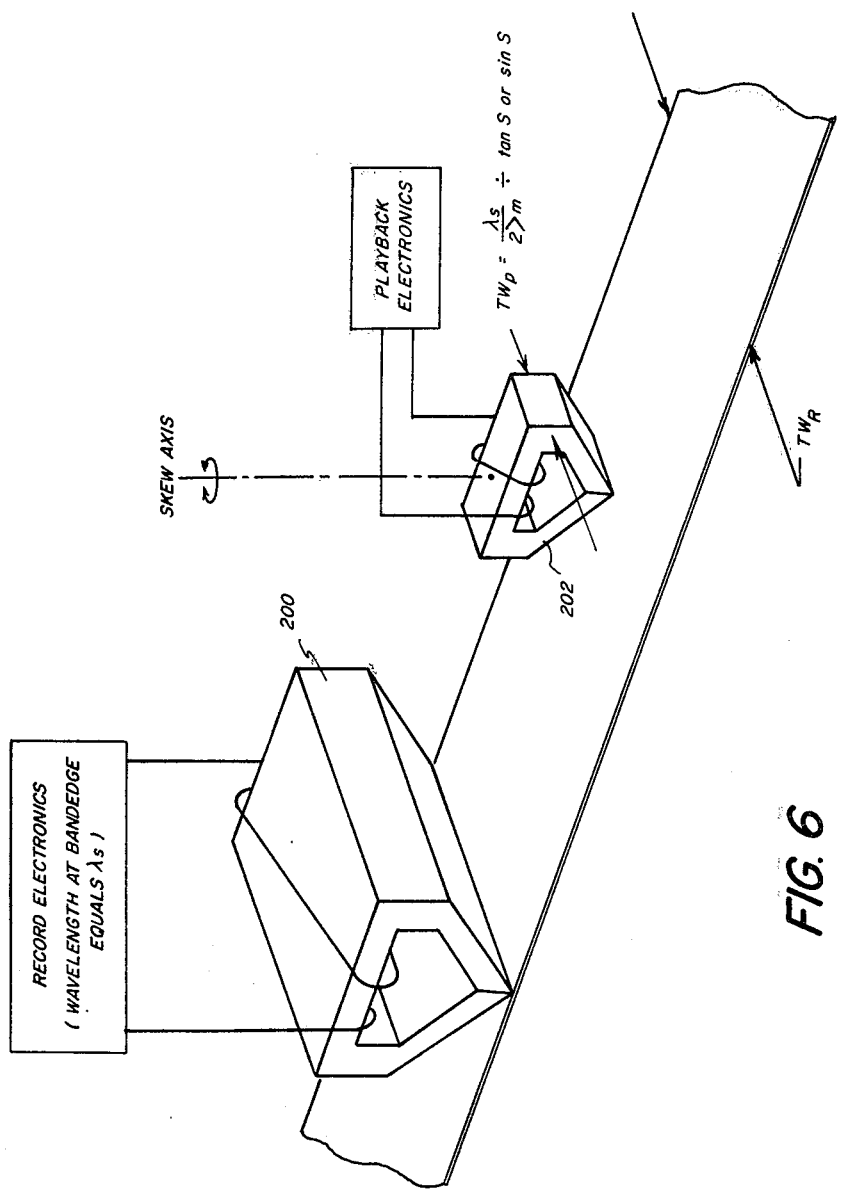
FIGS. 6 and 7 are block diagrams of apparatus embodying the invention.

Reference should now be had to FIG. 6: In a recorder designed to record, by means of a record head 200, a track of width $TW_R$ containing a band of signals, the shortest wavelength within which is $\lambda_S$, a playback head 202, having an effective widthwise dimension $TW_P$ which is less than $$\frac{\lambda_S}{2 \tan S} \text{ or } \frac{\lambda_S}{2 \sin S},$$

will provide immunity to bandwidth reduction caused by head azimuth errors corresponding to skew angles less than angle S. Such an application of the invention may, for example, find utility in connection with any of the commercially available helical scan recorders which are adapted for skew-producing fast-forwarding, etc.

Figure 7:
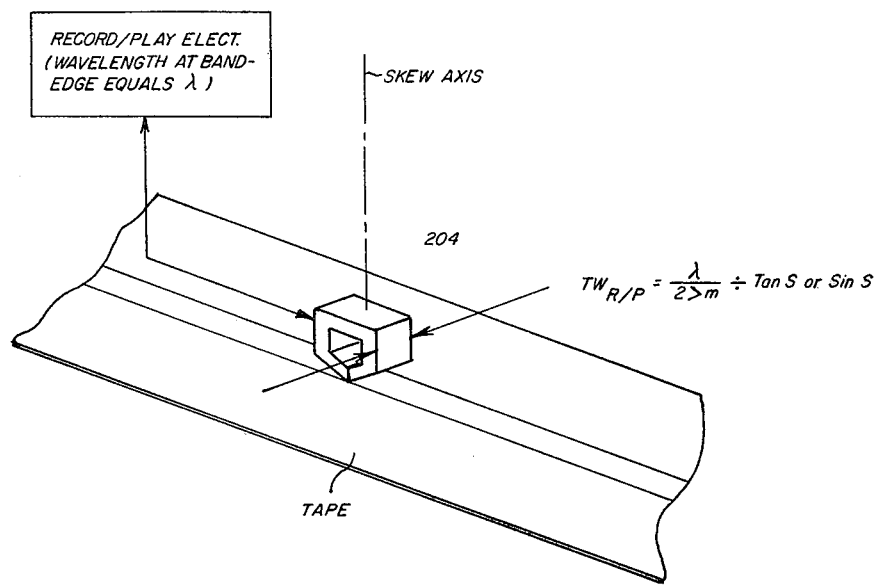

The apparatus of FIG. 7 is somewhat like that of FIG. 6, but contemplates recording a track $TW_{R/P}$, dimensioned pursuant to the invention, by means of a record/playback head 204. Whereas the technique employed in the apparatus of FIG. 6 will be useful, say, for the fast-forwarding, etc., of recordings having various prior art configurations, the apparatus of FIG. 7 anticipates that any recordings which are made, and subject to the matter of skew, will be suitably dimensioned trackwise in the first place, thereby to provide immunity to azimuth error.

The invention has been described in detail with particular reference to preferred embodiments thereof, but it will be understood that variations and modifications can be effected within the spirit and scope of the invention. For example, the invention is directly applicable to the editing machine concept disclosed in U.S. Pat. No. 4,193,098.

What is claimed is:

1. In apparatus for playing back a band of signals recorded in a track on magnetic recording medium, and which band of signals includes signal wavelengths as short as, but not shorter than, a given wavelength, said apparatus having a magnetic playback head cooperative with said medium for receiving flux corresponding to the signals in said band of signals recorded in said medium, and wherein, while playing back said band of signals, the maximum relative skew that can occur between said head and said track is approximately of a certain predetermined angle, the improvement wherein said magnetic head has a width that is less than about one half said given wavelength divided by the tangent of said predetermined angle, whereby said head will be immune to head azimuth error in its playback of said signals in said band of signals.

2. The improvement of claim 1 wherein said magnetic head has a width that is approximately one quarter said given wavelength divided by the tangent of said predetermined angle.

3. For use in playing back a band of signals magnetically recorded in a track on a magnetic medium, some of said signals having wavelengths as short as a certain predetermined wavelength, a playback head adapted to course said track at various skew angles up to a certain maximum skew angle, said playback head having a width which is less than about one half the shortest wavelength in said band of signals divided by the tangent of said maximum skew angle.

4. The playback head of claim 3 wherein its width is about one quarter the shortest wavelength in said band of signals divided by the tangent of said maximum skew angle.

5. In apparatus having means for magnetically recording and playing back a band of signals in a track on a magnetic tape, at least some of said signals having wavelengths as short as a certain predetermined wavelength, said apparatus including means for so moving said tape, while playing back said signals, relative to said means for recording and reproducing that an azimuth error corresponding to a predetermined skew angle occurs while playing back said signals, the improvement wherein said means for recording and playing back has an effective playback trackwidth that is less than about one half said certain predetermined wavelength divided by the tangent of said predetermined skew angle.

6. The improvement of claim 5 wherein said effective playback trackwidth is less than about one quarter said certain predetermined wavelength divided by the tangent of said predetermined skew angle.

7. The improved apparatus of claim 5 wherein said means for magnetically recording and playing back a band of signals is the same magnetic head used for both recording and playing back said band of signals.

8. The improved apparatus of claim 6 wherein said means for magnetically recording and playing back a band of signals is the same magnetic head used for both recording and playing back said band of signals.

* * * * *